3,414,652
MIXTURES OF EPN AND HYDROXAMATE
CARBAMATES
James B. Buchanan, Wilmington, Del., assignor to E. I. du Pont de Nemours and Company, Wilmington, Del., a corporation of Delaware
No Drawing. Continuation-in-part of application Ser. No. 484,121, Aug. 31, 1965. This application Aug. 1, 1966, Ser. No. 569,110
3 Claims. (Cl. 424—218)

ABSTRACT OF THE DISCLOSURE

This application relates to insecticidal mixtures. More particularly it is directed to mixtures of ethyl p-nitrophenyl thionobenzenephosphonate hereinafter called EPN and a hydroxamate carbamate selected from methyl O-(methylcarbamyl) thiolacetohydroxamate, methyl O-(carbamyl) thiolacetohydroxamate and their mixtures.

EPN has the following structural formula:

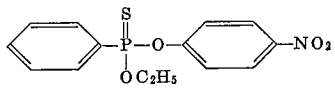

The hydroxamate carbamates have the following structural formula:

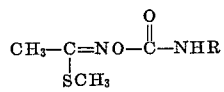

in which R is hydrogen or methyl.

CROSS REFERENCE TO RELATED APPLICATION

This application is a continuation-in-part of my copending application Ser. No. 484,121, filed Aug. 31, 1965, now abandoned.

BACKGROUND OF THE INVENTION

A continuing goal of pesticide research is the control by increasingly efficient methods of significant economic pests. Accenting this goal is the factor of increased pesticide resistance in various strains of pest species which in some instances causes control failures. EPN has been used for the control of various insect pests but has been limited somewhat by relatively high use-cost. More recently the hydroxamate carbamates have been discovered to be exceptionally effective in control of some major economic pests including insects, nematodes, and arachnids. I have discovered that combinations of EPN and the hydroxamate carbamates of this invention make possible unexpected and substantial decreases in the chemical dosages required to control major economic pests. Moreover the compositions of this invention provide not only for the degree of control desired of a pest specie with markedly less active chemical than is possible with the individual components, but also provide exceptional control of a number of widely divergent species which cannot be controlled with either component taken alone. It is of added significance that the compositions of this invention provide significant reduction in toxicological hazards associated with the use of insecticides.

DESCRIPTION OF THE INVENTION

As stated above, the compositions of this invention comprise EPN and a hydroxamate carbamate selected from methyl O-(methylcarbamyl) thiolacetohydroxamate, methyl O-(carbamyl) thiolacetohydroxamate and their mixtures. The EPN can be combined with the hydroxamate carbamate in almost any proportion but for convenience will ordinarily be combined in the range of 1 to 100 parts of EPN to 1 to 100 parts of hydroxamate carbamate. More preferred proportions are in the range of EPN to hydroxamate carbamate ratio of from 1:9 to 9:1.

Where a mixture of the hydroxamate carbamates is used in combination with EPN the hydroxamate carbamates will ordinarily be used in a ratio one to the other of from 1:100 to 100:1. However as with the overall ratio of EPN to hydroxamate carbamates it is preferred to use a ratio of mixed hydroxamate carbamates one to the other from 1:9 to 9:1.

The compositions of this invention are well suited for control of a broad variety of pest species including many members of the Phylum Arthropoda, Classes Diplopoda, Chilopoda, Arachnida and Insecta and the Phylum Nemathelminthes Class Nematoda. The compositions of this invention have shown exceptional activity against various strains of lepidoptera of the family noctuidae. Included in this family are such major economic pests as the tobacco budworm, *Heliothis virescens,* the cotton bollworm, *Heliothis zea,* the corn earworm, *Heliothis zea,* and the tomato fruitworm, *Heliothis zea.* In addition, the compositions of this invention have demonstrated exceptional activity against various strains resistant to other insecticides.

Formulations

The compositions of this invention will ordinarily perform more effectively if combined in the ways well known in the art for pesticidal formulations. Thus such known adjuvants such as wetting or spreading agents, stickers, emulsifiers or penetrants can be combined with advantage in the formulations of the compositions of this invention. In addition other pesticides such as insecticides, fungicides and other biologically active pesticides can be combined with the compositions of this invention.

If the compositions of this invention are to be formulated the individual components may, if desired, be admixed as preformulated preparations. Thus wettable powders or emulsifiable concentrates of EPN can be admixed with wettable powders, water soluble powders, or solution formulations of the hydroxamate carbamate. The resultant mixture can be diluted with water and dispersed with agitation so that a uniform application results. Formulations of EPN disclosed in U.S. Patent No. 2,503,390 are suitable for use in this invention. The formulations of hydroxamate carbamates disclosed in my copending applications Ser. No. 361,277 filed Apr. 20, 1964, and Ser. No. 484,121 filed Aug. 31, 1965, are likewise suitable for use in this invention.

The components of the compositions of this invention can of course be admixed prior to formulation. For example, compositions of EPN and a hydroxamate carbamate can be formulated as wettable powders, granules, dusts, organic solutions, or other formulations consistent with the chemical and physical properties of the active ingredients. Likewise powders applied to the surface of a carrier such as vermiculite or other preformed granular carriers and a binder can be used to prepare the active ingredients in particulate or granular form.

Such formulations can contain up to 40% of EPN or up to 90% of the hydroxamate carbamate, depending upon the proportions of the components desired in the final composition.

Such compositions in the form of wettable powders containing conditioning agents such as surface active agents and diluents are a preferred form of the compositions of this invention. These compositions are usually prepared by blending the EPN with all or part of the diluent, adding the remaining diluent, the surface active agent, and the hydroxamate carbamate followed by grinding to prepare a finely divided mixture. Suitable diluents and surface active agents are those well known in the art and disclosed in the above mentioned patent and copending applications.

Other preferred compositions are granules containing EPN and a hydroxamate carbamate of this invention. Such granular compositions can be prepared either by mixing granules containing EPN with granules containing a hydroxamate carbamate for common application from a granular applicator or by preparing compositions in which essentially each granule contains a mixture of EPN and a hydroxamate carbamate. The latter can be prepared by impregnating preformed granular carriers of clay or organic origin with EPN and a solution of a hydroxamate carbamate or by blending wettable powders containing these components with pelleting clays and then extruding or mulling the granules in the presence of moisture. The extrudate or the mulled plastic mass can then be dried. Granules can contain from 1 to more than 40% of active insecticidal ingredients in accordance with the type of the granule which is prepared and the intended use.

Dusts can be prepared by admixing wettable powders of the components of this invention with additional diluents to obtain the desired strength. Ordinarily strength of the dust will range from about 1 to 15% total insecticidal ingredients.

Organic solutions can be prepared by dissolving the EPN and hydroxamate carbamate along with emulsifiers in a common solvent. Such compositions will ordinarly contain wetting agents for subsequent use of the solution as a water emulsion. If low-volume direct application is the intended use such wetting agents can be omitted.

Application

The various formulations of the compositions of this invention described above can be applied by the many suitable means well known in the art. Methods and rates of application will be determined by the intended use and are, of course, influenced by the specie of pest to be controlled, its stage in the life cycle, the size of the pest specie, the manner of treatment, and the weather conditions prevalent during application.

Rate of application may be expressed in several different ways. Ordinarily for crops growing in the field it is customary and convenient to express dosages in terms of weight per unit of field area treated. On this basis, the total active chemical amounts employed for the combinations of this invention will usually range from .001 to 20 kilograms per hectare. However, for convenience and economy, rates will ordinarily range from .01 to 10 kilograms per hectare and preferably from .1 to 5 kilograms per hectare of combined active ingredients.

Another manner of expressing the rate of application of the compositions of this invention is the unit of weight of active ingredients per given volume of water in the resulting solution, suspension or emulsion when used to spray the pest to be controlled or the locus of the pest. Expressed in these terms the total amount of active chemical employed in the mixtures of this invention ranges from .001 to 20 kilograms per 100 liters of water. Again for reasons of economy and convenience the range will ordinarily be from .01 to 10 kilograms per 100 liters of water with a range of .1 to 5 kilograms being the preferred concentration.

Still another manner of characterizing application rate is as a proportion by weight of the active ingredients present in a dry dust used to treat the pest locus. By these terms rates of application will range from .001 to 40% by weight active ingredient in the dust to be applied. More preferred rates are from .01 to 20% by weight with the most preferred rate .1 to 10% by weight.

The following examples illustrate the compositions of the invention. Parts and percentages of these examples are by weight unless otherwise specified.

EXAMPLE 1

A water-soluble formulation containing methyl O-(methylcarbamyl) thiolacetohydroxamate is prepared as follows:

|  | Percent |
|---|---|
| Methyl O-(methylcarbamyl) thiolacetohydroxamate technical (95% active) | 95.0 |
| Fine silica | 4.5 |
| Alkylbenzenesulfonate, sodium salt | 0.5 |

The ingredients are mixed and granulated through a 40 mesh screen to obtain a uniform powder.

This formulation is added to water in an amount to provide 0.05 kilogram of the active hydroxamate carbamate in each 100 liters. To this solution is added sufficient emulsifiable EPN to provide 0.05 kilogram per 100 liters of active EPN. Thus, this preparation contains a 1:1 combination of methyl O-(methylcarbamyl) thiolacetohydroxamate and EPN in an amount totaling 0.1 kilogram of active ingredient per 100 liters. This is used to spray randomly-selected plots in a cabbage field known to be infested with the imported cabbage worm, *Pieris rapae*. Within two days after spraying essentially all of the imported cabbage worm population has been eliminated.

EXAMPLE 2

A water soluble formulation of methyl O-(carbamyl) thiolacetohydroxamate is prepared in the same manner as the formulation of Example 1.

The formulation is used along with a wettable powder formulation of EPN to make up a spray solution containing 0.05 kilogram per 100 liters of solution of each of EPN and methyl O-(carbamyl) thiolacetohydroxamate.

This spray solution is applied to the point of run-off to a row of tobacco plants in a field which is heavily infested with the tobacco hornworm, *Protoparce sexta,* and the tobacco budworm, *Heliothis virescens.* Four hours after the treatment a large proportion of the hornworm population is dead, and the budworm population is controlled to a surprisingly high degree.

EXAMPLE 3

A dust-base formulation containing 5% of methyl O-(methylcarbamyl) thiolacetohydroxamate is prepared by diluting the mixture of Example 3 with talc in the following proportions:

|  | Percent |
|---|---|
| Powder of Example 3 | 5.5 |
| Talc | 94.5 |

The composition is prepared by blending the ingredients and passing the mixture through a hammer mill to obtain good deagglomeration.

This formulation and a 25% active formulation of EPN sold by the Du Pont Company as EPN 300 are employed along with talc as a diluent, using blending procedures well known to the art, to prepare an insecticidal dust containing 0.1% of methyl O-(methylcarbamyl) thiolacetohydroxamate and 0.4% EPN.

This dust is applied at weekly intervals to a cotton field known to be infested with the variegated cutworm, *Peridroma margaritosa,* the cotton aphid, *Aphis gossypii,* and the Pacific spider mite, *Tetranychus pacificus*. The use rate at each application is 40 kilograms per hectare. After six weeks, the insect and mite population in the treated plot is markedly reduced as compared with similar untreated plots.

EXAMPLE 4

A dust-base formulation of methyl O-(carbamyl) thiolacetohydroxamate is prepared by diluting the formulation of Example 4 with talc in the manner employed in Example 5.

This dust-base formulation, along with the dust-base formulation of Example 5, EPN 300, and talc are blended together to prepare an insecticidal dust containing 0.4% methyl O-(methylcarbamyl) thiolacetohydroxamate, 0.4% methyl O-(carbamyl) thiolacetohydroxamate and 0.2% EPN.

This dust is applied weekly at the rate of 30 kilograms per hectare to a tomato field known to be infested with the tomato fruitworm, *Heliothis zea*. After four applications, the fruitworm populations are markedly reduced.

EXAMPLE 5

A wettable powder is prepared as follows:

| Composition— | Percent |
|---|---|
| EPN technical (87% active) | 23.0 |
| Methyl O-(methylcarbamyl) thiolacetohydroxamate technical (95% active) | 21.0 |
| Diatomaceous earth | 30.0 |
| Kaolinite clay | 23.0 |
| Sodium alkylnaphthalene sulfonate | 0.6 |
| Sodium lignin sulfonate | 2.4 |

The EPN is blended with the diatomaceous earth and the other ingredients are added and blended to obtain a homogeneous mixture. The composition is then passed through a hammer mill until the particle size is substantially less than 50 microns.

This wettable powder is added to water at the rate of .1 kilogram of powder (0.044 kilogram of total active ingredients) per 100 liters. The resulting aqueous suspension is used to spray trees to a point of run-off, in an ornamental planting of white oak, *Quercus alba*, growing in Connecticut. The aqueous solution is applied by spraying at intervals of two weeks, starting in early May and continuing through June. In early July the trees sprayed with the above wettable powder show a marked decrease in defoliation caused by the larvae of the gypsy moth, *Porthetria dispar*.

EXAMPLE 6

EPN granules are prepared by heating EPN until it is completely liquid and then spraying it into a blender where it is tumbled with granules of montmorillonite which have been warmed to about 38° C. The particles of granular montmorillonite have diameters in the range of from 0.25 to 0.60 mm. After spraying, the granular composition is 94% montmorillonite and 6% EPN technical (87% active).

Methyl O-(carbamyl) thiolacetohydroxamate is dissolved in 45° C. methanol to obtain a 50% solution which is applied to a tumbling mass of montmorillonite granules in the manner described above. The solvent is then allowed to evaporate to yield granules of the following composition:

| | Percent |
|---|---|
| Methyl O-(carbamyl) thiolacetohydroxamate technical (95% active) | 5.3 |
| Granular montmorillonite | 94.7 |

Randomly-selected rows of sweet corn are treated with the above granules at the rate of 10 kilograms of EPN granules and 10 kilograms of hydroxamate carbamate granules per hectare.

Treatment is started when the sweet corn plants are about 10 centimeters tall and is continued at weekly intervals until the plants are about 3 meters tall. The granules are distributed over the top of the rows of corn in such a way that they fall into the tip whorls and leaf axils of the plants. After the plants are about 3 meters tall inspection shows that damage due to the corn earworm, *Heliothis zea*, is almost completely absent in the plants treated with the above granules.

I claim:

1. A composition comprising 1 part by weight of ethyl p-nitrophenyl thionobenzenephosphonate and 1 part by weight of a hydroxamate carbamate selected from the group consisting of methyl O-(methylcarbamyl) thiolacetohydroxamate and methyl O-(carbamyl) thioacetohydroxamate.

2. A composition of claim 1 in which the hydroxamate carbamate is methyl O-(methylcarbamyl) thiolacetohydroxamate.

3. A composition of claim 1 in which the hydroxamate carbamate is methyl O-(carbamyl) thiolacetohydroxamate.

References Cited

UNITED STATES PATENTS 2,503,390   4/1950   Jelinek.
3,217,037   11/1965   Payne.

ALBERT T. MEYERS, *Primary Examiner.*

S. FRIEDMAN, *Assistant Examiner.*